US007934221B2

(12) United States Patent
Parker et al.

(10) Patent No.: US 7,934,221 B2
(45) Date of Patent: Apr. 26, 2011

(54) APPROACH FOR PROACTIVE NOTIFICATION OF CONTRACT CHANGES IN A SOFTWARE SERVICE

(75) Inventors: Kevin Christopher Parker, Burlingame, CA (US); Kelly Ann Shaw, Franktown, CO (US)

(73) Assignee: Serena Software, Inc., Redwood City, CA (US)

( * ) Notice: Subject to any disclaimer, the term of this patent is extended or adjusted under 35 U.S.C. 154(b) by 1094 days.

(21) Appl. No.: 11/713,955

(22) Filed: Feb. 27, 2007

(65) Prior Publication Data
US 2008/0209555 A1    Aug. 28, 2008

(51) Int. Cl.
G06F 15/163    (2006.01)
(52) U.S. Cl. ........................... 719/318; 717/122
(58) Field of Classification Search .................. 719/318
See application file for complete search history.

(56) References Cited

U.S. PATENT DOCUMENTS

| 2005/0086197 | A1 | 4/2005 | Boubez et al. | |
| 2006/0031225 | A1 | 2/2006 | Palmeri et al. | |
| 2006/0041665 | A1 | 2/2006 | Karnik et al. | |
| 2007/0239800 | A1* | 10/2007 | Eberlein | 707/203 |
| 2008/0071816 | A1* | 3/2008 | Gray | 707/101 |
| 2008/0082660 | A1* | 4/2008 | Bachmann et al. | 709/224 |
| 2008/0178169 | A1* | 7/2008 | Grossner et al. | 717/170 |

OTHER PUBLICATIONS

Brown, K.; Elis, M. "Best Practices For Web Services Versioning" (Jan. 30, 2004) [retrieved from http://www.ibm.com/developerworks/webservices/library/ws-version/ on Apr. 12, 2010].*

Kenyon. "Web Service Versioning and Deprecation." SOA Web Services Journal (Jan. 21, 2003) [retrieved from http://soa.sys-con.com/node/39678 on Apr. 12, 2010].*

Brottemja, P.; Cubera, F.; Ehnebuske, D.; Graham, S. "Understanding WSDL in a UDDI Registry, Part 1." (Sep. 1, 2001) [retrieved from http://www.ibm.com/developerworks/webservices/library/ws-wsdl/ on Apr. 12, 2010].*

Brottemja, P. "Understanding WSDL in a UDDI Registry, Part 2." (Sep. 1, 2001) [retrieved from http://www.ibm.com/developerworks/webservices/library/ws-wsdl2.html on Apr. 12, 2010].*

Brottemja, P. "Understanding WSDL in a UDDI Registry, Part 3." (Nov. 1, 2001) [retrieved from http://www.ibm.com/developerworks/webservices/library/ws-wsdl3/ on Apr. 12, 2010].*

Peltz, C.; Anagol-Subbarao, A. "Design Strategies for Web Services Versioning." (Apr. 5, 2004) [ retrieved from http://soa.sys-con.com/node/44356 on Apr. 12, 2010].*

Anand, S.; Kunti, K.; Chawla, M; Marwah, A. "Best Practices and Solutions for Managing Versioning of SOA Web Services" (Oct. 28, 2005). [retrieved from http://soa.sys-con.com/node/143883 on Apr. 12, 2010.*

(Continued)

*Primary Examiner* — Hyung S Sough
*Assistant Examiner* — Brian Wathen
(74) *Attorney, Agent, or Firm* — Hickman Palermo Truong & Becker LLP

(57) ABSTRACT

An approach is provided for proactive notification of contract changes in a software service. According to the approach, when the executable code of a composite application operable to access the service is generated, an initial copy of a contract that describes the service is retrieved. A baseline representation of the contract is generated based on the initial copy of the contract. When the composite application is being executed, a determination is made based on the baseline representation whether the contract has experienced any changes. In response to determining that the contract has experienced a change, a notification is sent indicating that the contract has experienced the change.

28 Claims, 7 Drawing Sheets

OTHER PUBLICATIONS

Brunner, R. et al., Java Web Services Unleashed (Apr. 2002). Sams Publishing. pp. 215-288, 616-639.*

Brunner, R., et al., Java Web Services Unleashed (Apr. 2002), Sams Publishing, pp. 7-42.*

Christensen, Erik, et al., "Web Services Description Language (WSDL) 1.1", Copyright 2001 Ariba, International Business Machines Corporation, Microsoft, W3C Note 15, Mar. 2001, retrieved from website <http://www.w3.org/TR/2001/NOTE-wsdl-20010315>, retrieved on Jun. 20, 2007, 31 pages.

* cited by examiner

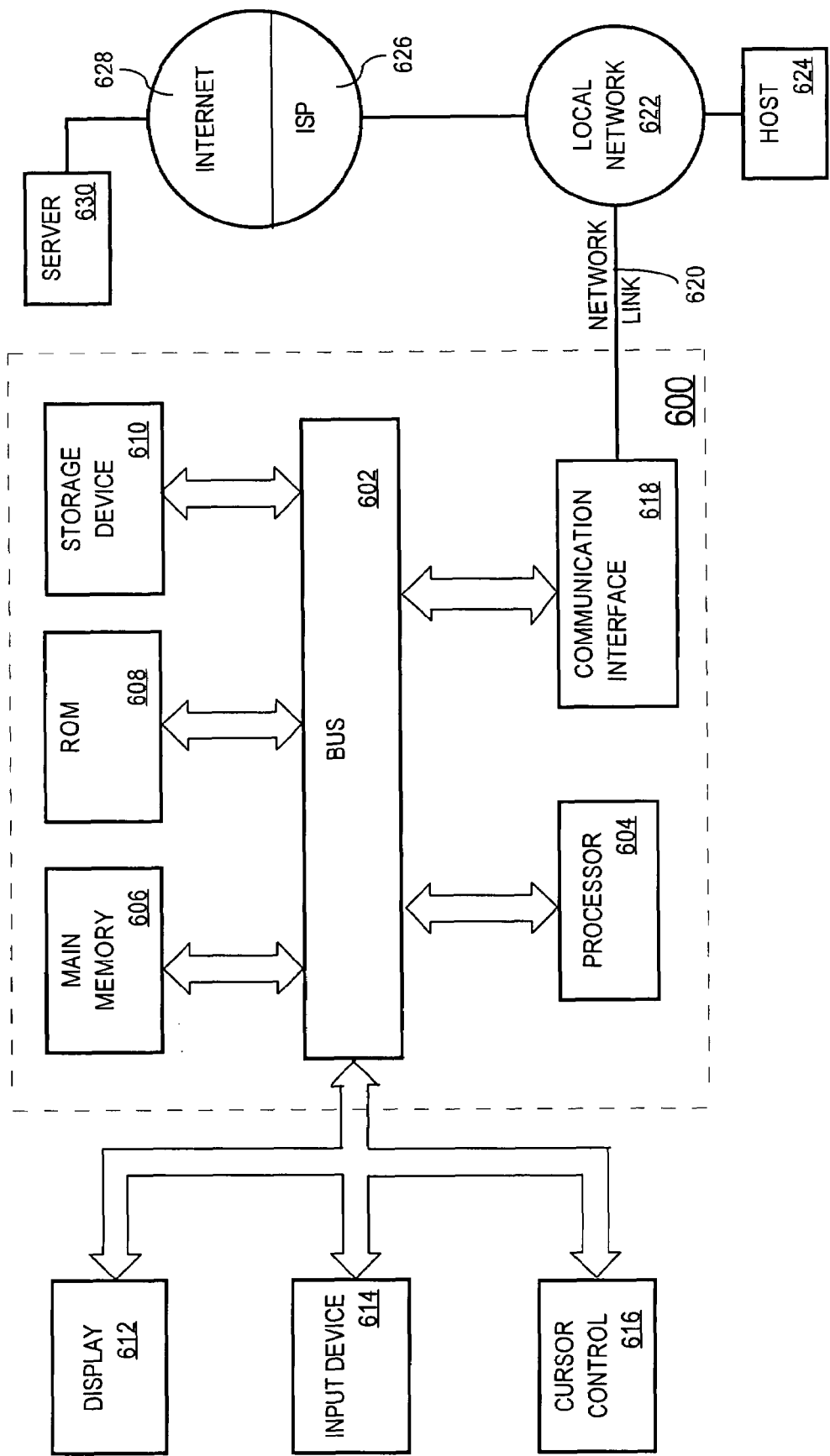

APPROACH FOR PROACTIVE NOTIFICATION OF CONTRACT CHANGES IN A SOFTWARE SERVICE

CROSS-REFERENCE TO RELATED APPLICATIONS

This application is related to U.S. patent application Ser. No. 11/712,033, entitled "APPROACH FOR VERSIONING OF SERVICES AND SERVICE CONTRACTS", filed by Kevin Christopher Parker et al. on the same day herewith, the entire contents of which is hereby incorporated by reference for all purposes as if fully set forth herein.

FIELD OF THE INVENTION

This invention relates generally to Service-Oriented Architectures (SOA) and more specifically, to an approach for detection and proactive notification of contract changes in a software service.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Traditionally, developing a business application involves including all of the logic of the application in one executable. The executable may include several components (e.g. executable files, dynamic-link library files, etc.), but when the executable is delivered all the components thereof co-exist all at the same place all at the same time. A new way of developing business applications is provided by the Service-Oriented Architecture (SOA) standards. With SOA, the development paradigm is changed so that different pieces of business logic are developed by independent providers. The SOA providers typically host services that provide the business logic on servers that are accessible over local networks and/or the Internet. For example, a SOA business application may comprise code written by in-house developers, where the code makes calls to services which provide the business logic and which are hosted by independent SOA providers that may be dispersed across the globe.

SOA standards address various issues such as, for example, code re-use and rapid development of business applications. But like any evolution in technology, along with SOA come some new challenges. One such challenge arises when SOA providers make changes to the services they provide. Because with SOA a business organization no longer owns all the code and relies on SOA providers for the logic of a business application, the business organization has no control of when or how a service executing at a server of a SOA provider is changed. Such change to a service may be benign from the perspective of the business organization; however, the fact that the service has changed is significant and the business organization utilizing the service needs to be aware of the change in order to evaluate the change and to avoid adverse consequences.

For example, suppose that a travel agency is using a business application that is receiving (sourcing), and displaying to end users, exchange rates information from a service provided over the web by a SOA provider. If the service providing the exchange rates information changes for whatever reasons (e.g. to improve exchange rate calculation algorithms), the actual change in the received exchange rates information is benign and insignificant; however, the fact that the service has changed is important because it may affect how the different portions of the business application interact with the service. In a well-governed application development environment, when a change in a service provided by a provider is made, the developers of business applications that utilize that service need to investigate and determine whether the change affects a particular business application or is indeed benign. For example, a change in a service may result in the service providing more information that may be of interest and that may add value to a particular business application. In another example, a change in the service may be such that it prevents the business application from interacting with the service any longer. Thus, the fact that a service has experienced changes is important, and such changes need to be detected and reported to the developers of business applications that access the service.

The problem caused by service changes is exacerbated for services that are not used very frequently by business applications because the information provided by the services is more obscure. For example, suppose that a travel agency business application is capable of displaying the timetable of bus schedules in Istanbul, Turkey, even though it is not likely that such timetable would be frequently accessed by application users in the U.S. When the service providing the timetable of bus schedules in Istanbul changes, it is necessary to proactively detect that change in order to be able to determine whether the change affects the travel agency business application in any way.

The problem caused by service changes may arise in a variety of operational scenarios. For example, some changes to services may be changes that totally disable the operation of a business application. In another example, it is possible that some changes to services are malicious, e.g. changes in the format of the data provided by a service may be intentionally designed to mislead. In yet another example, changes to a service may be versioned, and different executable versions of the service may evolve over time.

Based on the foregoing, there is a need for techniques that provide for detection and proactive notification of changes to services that are accessed by business applications.

BRIEF DESCRIPTION OF THE DRAWINGS

In the figures of the accompanying drawings like reference numerals refer to similar elements.

FIG. 6 is a block diagram that illustrates an example computer system on which embodiments of the invention may be implemented.

DETAILED DESCRIPTION

Figure 1:
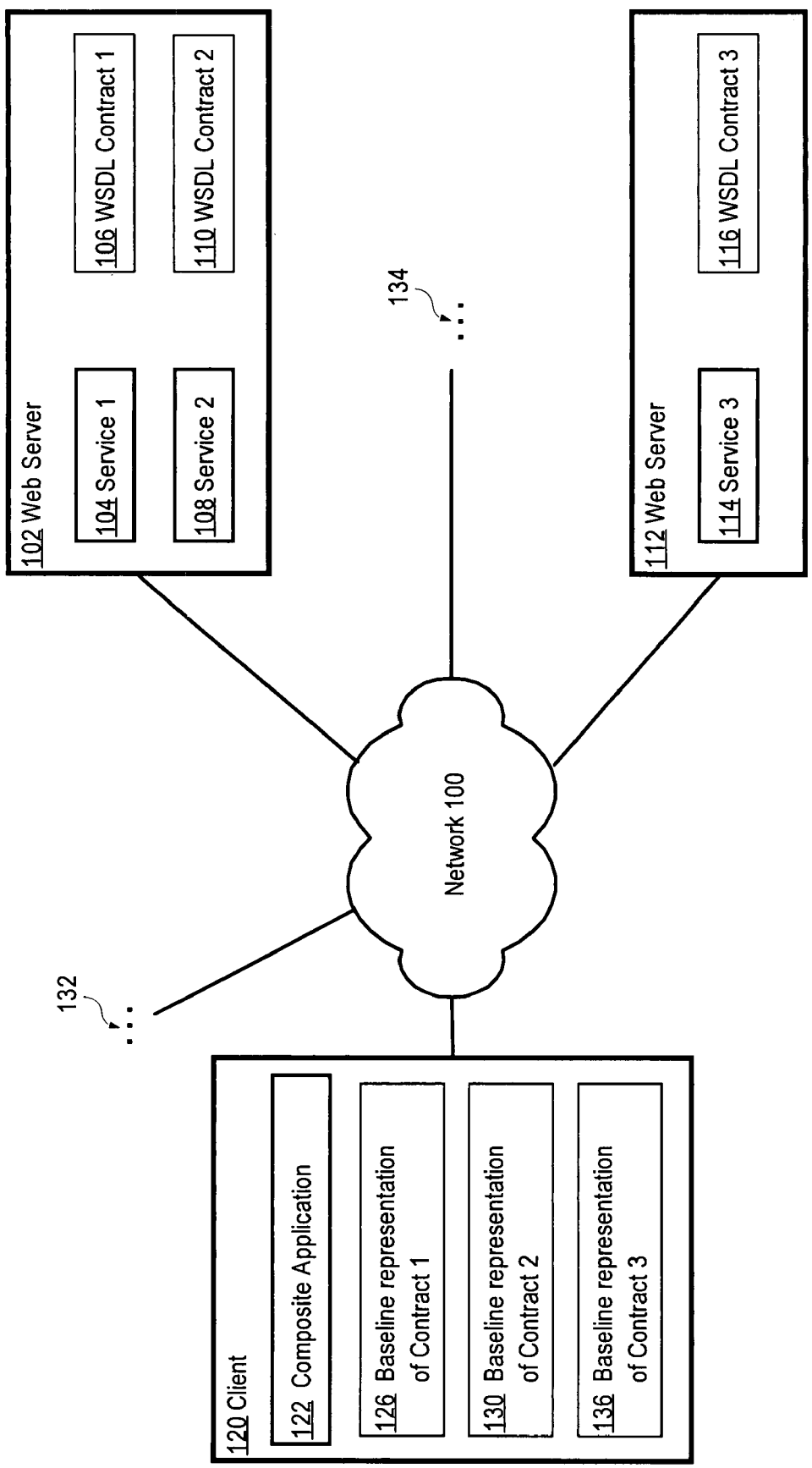
FIG. 1 is a block diagram that illustrates an example operational context in which embodiments may be implemented.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. EXAMPLE OPERATIONAL CONTEXT
    III. GENERATING BASELINE REPRESENTATIONS
    IV. DETECTING SERVICE CONTRACT CHANGES
    V. NOTIFYING ABOUT DETECTED SERVICE CONTRACT CHANGES
    VI. ANALYZING SERVICE CONTRACT CHANGES
    VII. VERSIONING SERVICES AND SERVICE CONTRACTS
    VIII. REPORTING SERVICE VERSION INFORMATION
    IX. UTILIZING DIFFERENT EXECUTABLE SERVICE VERSIONS
    X. IMPLEMENTATION MECHANISMS

I. Overview

In one embodiment, an approach is provided for detection and proactive notification of contract changes in a software service. When the executable code of a composite application operable to access the service is generated, an initial copy of a contract that describes the service is retrieved. A baseline representation of the contract is generated based on the initial copy of the contract. When the composite application is being executed, a determination is made based on the baseline representation whether the contract has experienced any changes. In response to determining that the contract has experienced a change, a notification is sent indicating that the contract has experienced the change.

In one embodiment, an approach is provided for versioning of services and service contracts. When the executable code of a service external to one or more composite applications is generated, first version information is automatically stored in a contract that describes the service. The first version information stored in the contract specifies a first executable version of the service. When the executable code of the service is re-generated, the first version information stored in the contract is automatically modified into second version information. The second version information specifies a second executable version of the service.

In one embodiment, an approach is provided for reporting version information about a service that is external to one or more composite applications. A get-version request from a particular composite application is received at the service. In response to the get-version request, current version information is retrieved from a contract that describes the service. The current version information specifies a current executable version of the service. A response that includes the current version information is sent to the particular composite application.

In one embodiment, an approach is provided for detecting and utilizing different executable versions of a service that is external to one or more composite applications. A first get-version request is sent to the service. In response to the first get-version request, first version information that specifies a first executable version of the service is received. At some point thereafter, a second get-version request is sent to the service. In response to the second get-version request, second version information that specifies a second executable version of the service is received. Based on the first version information and the second version information, a determination is made whether the first executable version of the service is different than the second executable version of the service.

II. Example Operational Context

FIG. 1 is a block diagram that illustrates an example operational context in which embodiments may be implemented. In this operational context, client 120 and web servers 102 and 112 are operable to communicatively connect to each other over a network 100. This operational context may include other clients as indicated by ellipsis 132 as well as other servers as indicated by ellipsis 134. Network 100 may be implemented by any medium or mechanism that provides for the exchange of data between clients and servers. Examples of network 100 include, without limitation, a Local Area Network (LAN), Wide Area Network (WAN), the Internet, or one or more terrestrial, cable, satellite, or wireless links.

A client, such as client 120, may comprise a combination of software components and hardware components, such as memory and one or more processors, where the one or more processors are operable to execute the software components. A server, such as web servers 102 and 112, may comprise a combination of software components and hardware components, such as memory and one or more processors, where the one or more processors are operable to execute some of the software components as processes that are operable to respond to requests and calls by clients of the server.

As used herein, "service" refers to a process that is executing on a server, where the service is described in a contract. Examples of services include, but are not limited to, software services that conform to a SOA standard. As used herein, "contract" refers to a set of information that describes a service. The contract of a service may specify zero or more input interfaces and/or zero or more output interfaces of the service. For example, in some embodiments a contract may define only one or more input interfaces of the service but no output interfaces, and vice versa. In another example, in some embodiments a contract may define an "empty set" input interface. In yet another example, in some embodiments a contract of a service may not define an input interface at all. In some embodiments, a contract may comprise a Web Services Description Language (WSDL) definition that includes elements and attributes defined in an eXtensible Markup Language (XML) format, where the elements and attributes of the WSDL definition may describe a particular SOA service.

Referring to FIG. 1, web server 102 comprises service 104 and service 108. Service 104 is associated with contract 106, which comprises a WSDL definition describing service 104. Service 108 is associated with contract 110, which comprises a WSDL definition describing service 108. Web server 102 may store contracts 106 and 110 in one or more volatile and/or non-volatile machine-readable media to which the server is communicatively and/or operatively coupled. Similarly, web server 112 comprises service 114, which is associated with contract 116. Contract 116 comprises a WSDL definition that describes service 114. Web server 112 may store contract 116 in one or more volatile and/or non-volatile machine-readable media to which the server is communicatively and/or operatively coupled.

Client 120 comprises composite application 122 and baseline representations of service contracts 126, 130, and 136. As used herein, "composite application" refers to an application which, when executed, is operable to access one or more services that are provided on computer systems that are external to the application. Examples of composite applications include, but are not limited to, business applications that conform to a SOA standard. As used herein, "baseline representation" refers to a set of information that represents a contract describing a service that is external to a composite application. In some embodiments, a contract represented by a baseline representation may specify zero or more input interfaces and/or zero or more output interfaces of a service. In some embodiments, a baseline representation may comprise a hash token that is generated based on the content of a contract. In addition, or instead of, in some embodiments a baseline representation may comprise a copy of the contract itself.

Referring to FIG. 1, composite application 122 is operable to access services 104 and 108 that are provided by web server 102 and service 114 that is provided by web server 112. (For illustration purposes, composite application 122 is depicted as operable to access three services; however, it is noted that the approaches described herein may be implemented for composite applications that are operable to access any number of services.)

Baseline representation 126 is generated based on the contents of contract 106, which describes the input and output interfaces of service 104 that is provided by web server 102. Baseline representation 130 is generated based on the contents of contract 110, which describes the input and output interfaces of service 108 that is provided by web server 102. Baseline representation 136 is generated based on the contents of contract 116, which describes the input and output interfaces of service 114 that is provided by web server 112. Baseline representations 126, 130, and 136 may be stored in one or more volatile and/or non-volatile machine-readable media, which are communicatively and/or operatively accessible by composite application 122 and/or any other applications or processes executing on client 120.

According to one approach for detection and proactive notification of service changes described herein, at the time when the executable code of composite application 122 is generated, initial copies of contracts 106, 110, and 116 are retrieved from services 104, 108, and 114, respectively. In some embodiments, the initial copies of contracts 106, 110, and 116 may be retrieved by a build process that generates the executable code of composite application 122. In some embodiments, the initial copies of contracts 106, 110, and 116 may be retrieved by a source code management application that is separate from composite application 122 and that is operable to maintain multiple versions of the source code of the composite application. Thereafter, baseline representations 126, 130, and 136 are generated based on the retrieved copies of contracts 106, 110, and 116, respectively.

At the time when composite application 122 is executed, or on a periodic basis, baseline representations 126, 130, and 136 are used to determine whether contracts 106, 110, and 116, respectively, have experienced any changes since the time composite application 122 was generated.

For example, when composite application 122 is executed, a determination whether contract 106 has experienced a change may be made in the following way. Composite application 122 or another process executing on client 120 makes a call to service 104 and retrieves a current copy of contract 106. A current representation of contract 106 is generated, and the current representation is compared to the previously generated baseline representation 126. If the current representation is different than the baseline representation, then a determination is made that contract 106 has experienced a change since the time composite application 122 was generated. In response to determining that contract 106 has changed, a notification is sent by using some specified mechanism to inform selected users of composite application 122 that the contract has changed. Detecting changes in contracts 110 and 116 may be performed in a similar way.

In this manner, the approach described herein provides for detection and proactive notification of changes that may be experienced by services throughout the life of a composite application that is operable to access these services. While the approach is described in FIG. 1 with respect to web servers and WSDL contracts, it is noted that the approach is not limited to any particular type of servers or services thereof. The approach described herein may be implemented with respect to services provided by any type of servers such as, for example, database servers, e-mail servers, FTP servers, and HTTP servers. In addition, the operational context with respect to which the approach is described in FIG. 1 may include other implementation-dependant components and elements that are not depicted in FIG. 1 in order to avoid unnecessarily obscuring the approach. Thus, the operational context and the specific details thereof depicted in FIG. 1 are to be regarded in an illustrative rather than a restrictive sense.

III. Generating Baseline Representations

In one embodiment, a contract for a SOA service comprises a WSDL definition. In this embodiment, the WSDL definition may specify zero or more input interfaces and/or zero or more output interfaces of the SOA service. The WSDL definition conforms to the Web Services Description Language (WSDL) 1.1 Specification, which was published as a W3C Note on 15 Mar. 2001, the entire contents of which are hereby incorporated by reference for all purposes as if fully set forth herein. In this embodiment, the WSDL definition includes attributes and elements that are defined in an XML format. The WSDL definition may describe a web service as a set of one or more service ports. A service port is a network endpoint that comprises a combination of a network address and a binding, where the binding specifies a network communication protocol and a message format that is associated with a particular service port type. The message format is a description of data that may be sent to and from a service, and a service port type refers to a collection of operations that are defined for and may be performed by the service. The WSDL definition may include separate bindings that represent and define the input interface and the output interface of the web service.

Figure 2A:
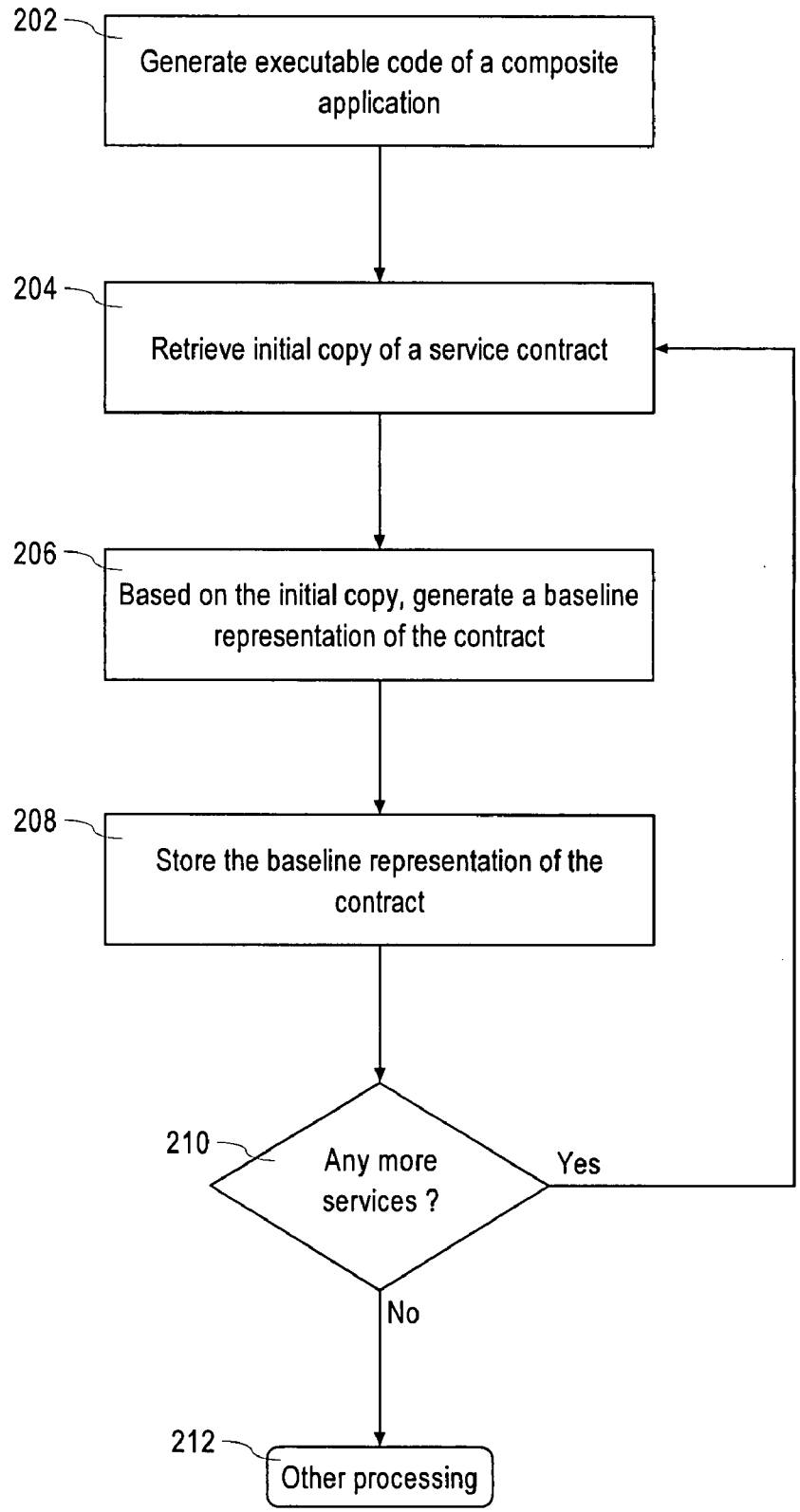
FIGS. 2A and 2B are flow diagrams that illustrate a method for detection and proactive notification of service changes according to one embodiment.

FIG. 2A is flow diagram that illustrates a method for generating baseline representations for service contracts of services that are accessible by a composite application. In one embodiment, the steps of the method illustrated in FIG. 2A may be performed by a build process which is external to the composite application and which, when executed, is operable to generate the executable code of the composite application. In one embodiment, the steps of the method illustrated in FIG. 2A may be performed by a source code management application that is operable to maintain multiple versions of the source code of the composite application. In other embodiments, the steps of the method illustrated in FIG. 2A may be performed by other software applications (e.g. compilers, linkers, etc.) that may be operable to generate executable code.

In step 202, the executable code of a composite application is generated. The composite application comprises logic that includes calls to one or more services that are external to the composite application.

At the time when the executable code of the composite application is generated, in step 204 an initial copy of a contract that describes a service is retrieved from that service. For example, the process that generates the executable code of the composite application (e.g. a build process, a compiler process, a linker process, etc.) can make a call to the service to retrieve the contract. The initial copy of the contract may specify an input interface and/or an output interface of the service at the time the composite application is generated.

In step 206, a baseline representation of the contract retrieved in step 204 is generated based on the initial copy of the contract. The baseline representation reflects the contract as it exists at the time when the composite application is generated. For example, the baseline representation may reflect the input and output interface specified in the contract at the time when the composite application is generated. To generate the baseline representation, in one embodiment logic may be executed to apply a hashing algorithm to the initial copy of the contract in order to reduce the contract to a hash token. The token may then be stored in, or alternatively as, the baseline representation. In some embodiments, in addition or instead of a token, the content of the initial copy of the contract may be stored in the baseline representation.

In step 208, the generated baseline representation is stored in one or more machine-readable media that are communicatively coupled to and accessible by the composite application and/or any other applications and processes that may be executing at the same client as the composite application. In some embodiments, the baseline representation may be stored in a data structure in a repository (e.g. a table in a database, or a file in a directory), which may be used for storing the baseline representations of other services that may be accessed by the same or other composite applications.

In step 210, a determination is made of whether the composite application includes logic for invoking any other services. If the composite application includes logic that invokes other services, then steps 204 to 210 are repeated for each such service in order to generate and store a baseline representation for the contract associated with that service. When the baseline representations for all contracts of services accessed by the composite application are generated and stored, in step 212 the generation of the composite application continues with other processing.

IV. Detecting Service Contract Changes

Figure 2B:
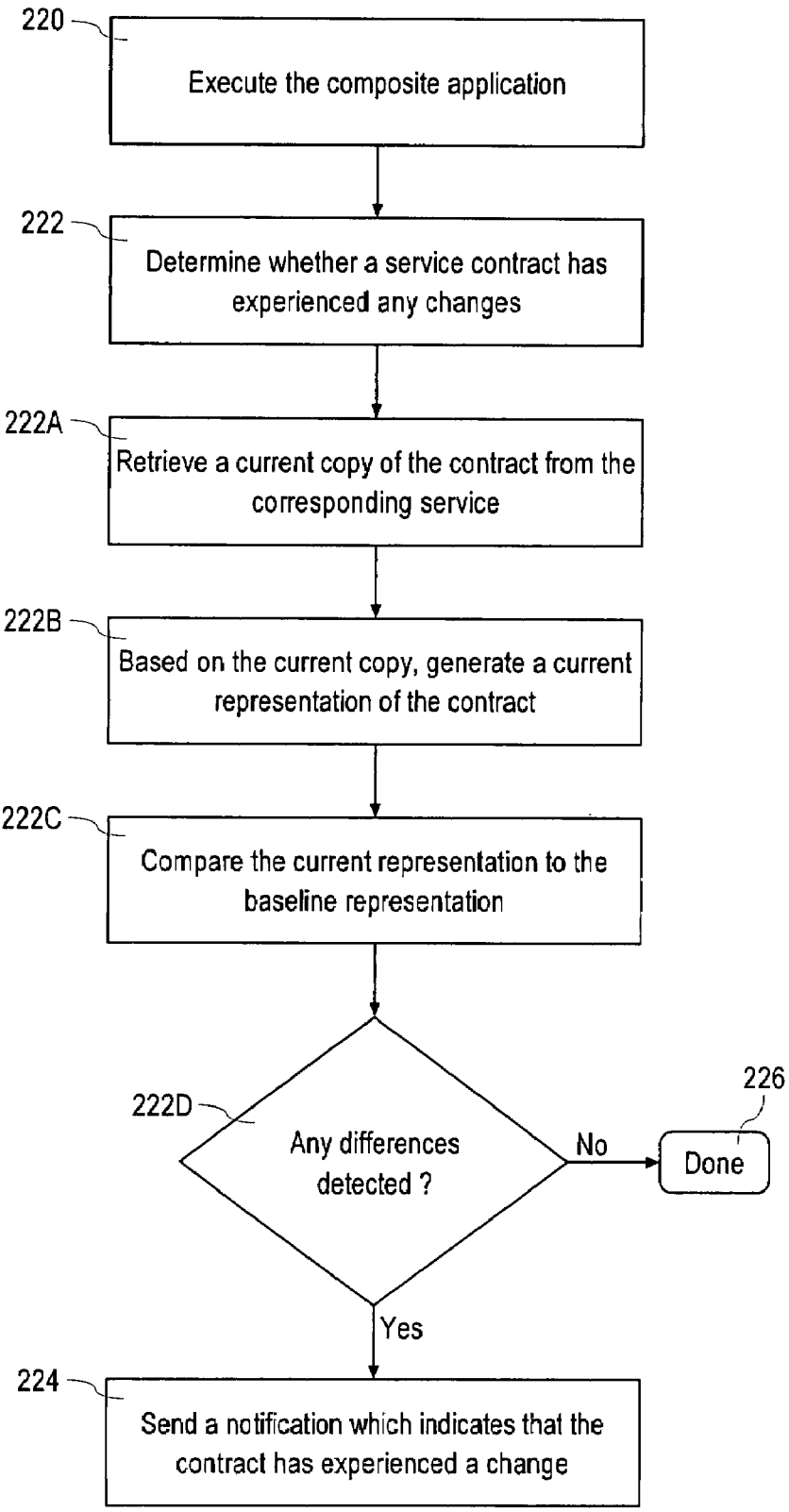

FIG. 2B is flow diagram that illustrates a method for detecting, during execution time, changes in a contract of a service that is accessible by a composite application. In one embodiment, the composite application may include logic which, when executed, is operable to perform the steps of the method illustrated in FIG. 2B periodically or before any call is made to the service. In one embodiment, the steps of the method illustrated in FIG. 2B may be performed by a process or by an application that is external to the composite application. In this embodiment, the external process or application may include logic which, when executed, is operable to periodically poll each service accessed by the composite application for that service's current contract. In other embodiments, a client executing the composite application may provide other mechanisms that include logic for performing the steps of the method illustrated in FIG. 2B.

In step 220, the composite application is executed at a client. In step 222, a determination is made of whether a contract of a service accessed by the composite application has experienced any changes since the time at which the composite application was generated. Step 222 may be performed on a periodic basis or before each call to the service is made from the composite application. In order to determine whether a service contract has experienced any changes, step 222 may comprise several sub-steps, such as steps 222A to 222D. If the composite application includes logic for accessing multiple services, step 222 and its sub-steps may be performed for each service in order to determine whether the contract of that service has experienced any changes since the time at which the composite application was generated.

In step 222A, a current copy of the contract is retrieved from the service accessed by the composite application. The current copy of the contract may be retrieved in the same manner (e.g. by making a call to the service) in which the initial copy of the contract was retrieved from the service at the time the composite application was generated. The current copy of the contract may specify an input interface and/or an output interface of the service at the time the composite application is being executed.

In step 222B, a current representation of the contract is generated based on the copy of the contract in the same manner in which the baseline representation was generated from the initial copy of the contract at the time the composite application was generated. For example, if the baseline representation comprises a token generated from the initial copy of the contract by applying a hashing algorithm, then the current representation of the contract is generated to comprise a current token by applying the same hashing algorithm to the current copy of the contract. In another example, if the baseline representation comprises the content of the initial copy of the contract, then the current representation of the contract is generated to comprise the content of the current copy of the contract.

In step 222C, the current representation of the contract is compared to the baseline representation of the contract. For example, if the current representation comprises a current token hashed from the current copy of the contract and the baseline representation comprises a baseline token hashed from the initial copy of the contract, then the current token may be compared to the baseline token to determine whether the contract has experienced any changes. In another example, if the current representation comprises the content of the current copy of the contract and the baseline representation comprises the content of the initial copy of the contract, then a string comparison may be performed between the current and the initial copies of the contract to determine whether the contract has experienced any changes.

In step 222D, a determination is made whether the comparison indicates that the current representation of the contract is different than the baseline representation of the contract. If no differences are detected in step 222D, then a determination is made that the contract has not experienced any changes since the time at which the composite application was generated and consequently the method completes in step 226.

If a determination is made in step 222D that the current representation of the contract is different than the baseline representation of the contract, then in step 224 a notification is sent through a specified notification mechanism to a specified destination, where the notification indicates that the contract has experienced a change.

In one embodiment, the contract of a service accessed by a composite application may store version information about the service. For example, the version information may specify, though a version number or other means, a particular executable version of the service. The version number of the particular executable version may be included in the contract when that executable version of the service is generated (for example, by a build process). By storing version information in the contract, this embodiment allows for detecting changes in the service that may not necessarily affect any input or output interfaces of the service that are defined in the contract. For example, a version number (e.g. "3.1") may be stored in the contract of a service that provides exchange rates information at the time a new executable version of the service is generated. The new executable version of the service may have been generated to implement an improved algorithm for computing exchange rates even though the input interface (thorough which exchange rates are requested) or the output interface (through which the exchange rates are reported) are not changed.

In this embodiment, when the initial copy of the contract is retrieved at the time when the composite application is generated, the version information from the initial copy of the contract is included in the baseline representation. Subsequently, at the time when the composite application is being executed, the current version information may be retrieved from the current copy of the contract and stored in the current representation of the contract. The current version information from the current representation may then be compared to the baseline version information from the baseline representation in order to determine whether the service has experienced any changes since the time at which the composite application was generated.

In one embodiment, the contract of a service accessed by a composite application may store version information about the service and/or the service contract. In this embodiment, at the time when the composite application is generated, an initial copy of the contract may be retrieved from the service. The initial copy of the contract and the version information stored therein may be both included in the baseline representation of the contract. Subsequently, at the time when the composite application is being executed, a current copy of the contract may be retrieved from the service. The current copy of the contract and the current version information stored therein may be both included in the current representation of the contract. In order to determine whether the service and/or the contract have experienced any changes since the time at which the composite application was generated, the version information stored in the current representation of the contract is first compared to the version information stored in the baseline representation of the contract. If a difference is detected, then a determination may be made that the contract and/or the service have experienced a change, and a notification may be sent accordingly. If the version information is the same in both the current representation and the baseline representation, then the current copy of the contract stored in the current representation may be compared to the initial copy of the contract stored in the baseline representation to determine whether the contract and/or the service have experienced a change. If a difference is detected, then a notification indicating that the contract and/or the service have experienced a change may be sent accordingly.

In one embodiment, at the time a composite application is being executed, a current copy of the contract of a service accessed by the composite application may be retrieved. A determination is then made whether the previously generated and stored baseline representation of the contract includes baseline version information that specifies a baseline executable version of the service. A determination is also made whether the current copy of the contract includes current version information that specifies a current executable version of the service. If the baseline version information and the current version information are both available, then the current version information may be compared to the baseline version information in order to determine whether the contract and/or the service has experienced any changes since the time at which the composite application was generated. If one or both of the current version information and the baseline version information are not available, then a current representation of the contract may be generated based on the current copy of the contract. Thereafter, the current representation may be compared to the baseline representation to determine whether the contract has experienced any changes since the time at which the composite application was generated.

The techniques described herein for detecting service and/or service contract changes based on version information may be implemented in a variety of ways. For example, in some embodiments, the contract of a service may comprise a WSDL definition in an XML format. The WSDL definition may include separate XML elements for specifying the executable version of the service and the version of the contract (e.g. a "service_version" XML element and a "contract_version" XML element). Alternatively, the WSDL definition may include a single XML element that specifies a version number which reflects changes made to the service and its contract (e.g. a single "version" XML element). Depending on the manner in which version information is represented in the service contract, a composite application may include different logic for determining whether a service accessed by the composite application and/or the contract thereof have experienced any changes. Thus, the techniques for detecting service and/or service contract changes based on version information described herein are to be regarded in an illustrative rather than a restrictive sense.

V. Notifying about Detected Service Contract Changes

According to the approach described herein for detection and proactive notification of contract changes in a software service, in response to detecting a service contract change, a notification may be sent through a specified notification mechanism to a specified destination. The approach described herein is not limited to any particular mechanism or technique by which notifications may be sent in response to detecting a service contract change.

For example, in one embodiment an e-mail may be sent to a developer or administrator of a composite application that accesses the service whose contract has experienced a change. The e-mail may indicate that contract has experienced the change and may include other information, for example the time at which the contract change was detected. In one embodiment, in addition or instead of an e-mail, a record may be stored in a log where the record indicates that the contract has experienced the change. In addition, or instead of, in one embodiment a ticket may be automatically opened in a defect tracking system to indicate that a change in the contract of a service utilized by the composite application has been detected. In some embodiments, in response to detecting a change in a service contract, an appropriate event may generated by an event management system where the event management system is operable to distribute the event to one or more pre-configured recipients.

In one embodiment, a composite application may include logic which when executed is operable to report detected service contract changes to a particular notification service. For example, the notification service may provide a specific service port that is operable to receive messages that inform of changes in the service contracts of other services. In this embodiment, in response to detecting that the service contract of a particular service has experienced a change, the composite application may construct a message conforming to the input interface of the notification service and may send the message to the service port of the notification service.

VI. Analyzing Service Contract Changes

According to the approach described herein for detection and proactive notification of contract changes in a software service, in response to detecting a service contract change, a composite application or another associated software component may analyze the change to determine whether and how the change affects the composite application. When the analysis of the change determines that the change affects the composite application, a message may be sent to a developer or administrator of the composite application with data describing how the change affects the application.

For example, in one embodiment the contract of a service may comprise a WSDL definition in an XML format. In this embodiment, the baseline representation of the service contract may include the initial copy of the contract that is retrieved from the service at the time when the composite application is generated. Subsequently, a current copy of the contract may be retrieved from the service at the time when the composite application is being executed. The current copy of the contract may then be compared to the initial copy of the contract in order to determine the particular nature of the detected changes, for example: whether the current copy of the contract includes the set of all XML elements and attributes that were present in the WSDL definition at the time the composite application was generated; whether the current copy of the contract includes XML elements with new, previously unknown tags; whether the names of tags associated with selected XML elements have changed; whether selected attributes of some pre-selected elements have changed; and whether enumerated values in some pre-selected XML elements include values that have been added, changed, or deleted. Any detected changes, the effects thereof, and/or an automatic assessment whether the changes are significant with respect to the composite application may be reported to a developer or administrator of the composite application through any suitable notification mechanism.

In some embodiments, an application separate from the composite application may be provided to analyze the changes detected in the service contracts of services accessed by the composite application. The separate application may include logic which, when executed in response to detecting a service contract change, is operable to perform various types of analysis in order to determine whether and how the detected change affects the composite application. The approach described herein for detection and proactive notification of contract changes is not limited to any particular type or method of analyzing contract changes, and for this reason the above technique for analyzing contract changes is to be regarded in an illustrative rather than a restrictive sense.

VII. Versioning Services and Service Contracts

An approach is provided herein for versioning of services and service contracts. At the time when the executable code of a service is generated, version information indicating a particular executable version of the service is automatically stored in the contract that describes the input and output interfaces of the service. Thereafter, every time the executable code of the service is re-generated, the version information stored in the contract is automatically updated accordingly.

According to this approach, the version information stored in the contract may include various data elements including, but not limited to, version numbers (for example, major and minor version numbers), comments describing the changes made in a particular executable version of the service, the date and time the executable version of the service was created and deployed, and any other information that may be provided with a software release.

In one embodiment, the contract of a service may comprise a WSDL definition in an XML format. In this embodiment, the version information may be stored in a "version" XML element of the WSDL definition, where the "version" element may store a version number and/or any other version information in one or more sub-elements and/or element attributes. In other embodiments, any data structures different from a WSDL definition that are suitable for storing structured and formatted data may be used to store version information associated with services and/or service contracts.

The approach described herein for versioning services and service contracts may be implemented for any services and service contracts thereof that conform to any SOA or SOA-related standard. Thus, this approach is not limited to any particular type of service or service contract, to any particular type of version information, or to any particular manner for storing such version information. For this reason the examples of services, service contracts, version information, and version information data structures provided herein are to be regarded in an illustrative rather than a restrictive sense.

Figure 3:
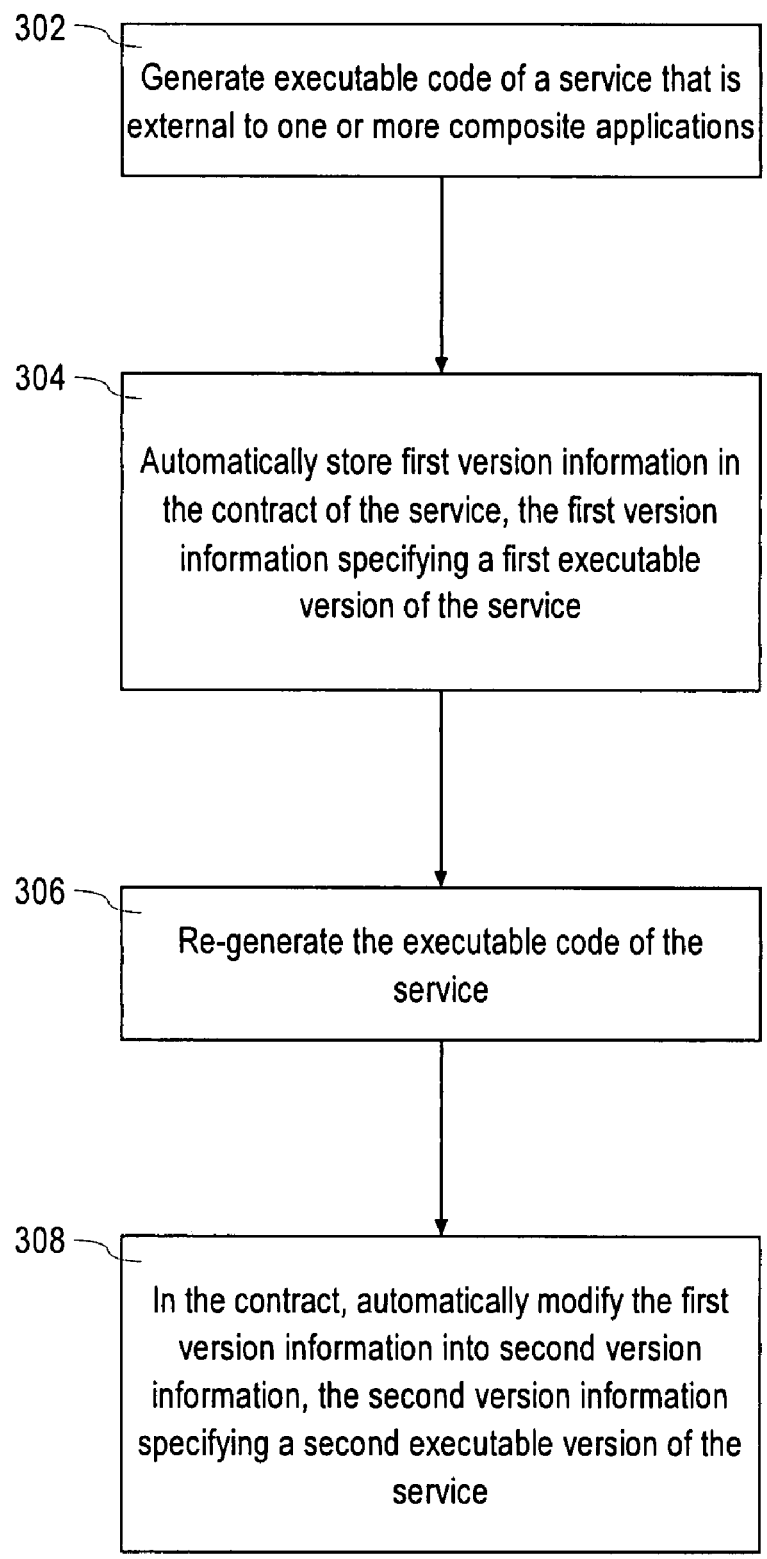
FIG. 3 is a flow diagram that illustrates a method for versioning of services and service contracts according to one embodiment.

FIG. 3 is a flow diagram that illustrates a method for versioning of services and service contracts according to this approach. In step 302, the executable code of a service is generated. Before, during, or after generating the executable code of the service, or as part thereof, in step 304 version information indicating a first executable version of the service is automatically stored in the contract associated with the service.

After any arbitrary period of time has passed, in step 306 the executable code of the service is re-generated in step 306. Re-generating the executable code of the service may include, for example, recompiling the source code of the service and re-deploying the resulting executable.

Before, during, or after re-generating the executable code of the service, or as part thereof, in step 308 the version information stored in the contract is automatically modified to indicate a second executable version of the service that is different than the previously indicated first executable version of the service. The update of the version information in the contract may include increasing the version number of the service. For example, an appropriate increase in the major and/or minor version of the service may be made depending on the changes that were made to the service.

In one embodiment, the approach described herein for versioning of services and service contracts may be performed by a build process which, when executed, is operable to generate the executable code of the service. For example, the build process may include calls to logic which when executed is operable to: determine the new version information of the build that is being generated by the build process (for example, by accessing the source code of the service or by requesting the information from a user); determine the location of and access the service contract; and store the new version information in the appropriate place within the contract. The logic called by the build process may be included within the build process itself or within any software application that may be invoked by the build process.

In one embodiment, the approach described herein for versioning of services and service contracts may be performed by a source code management application that is operable to maintain a plurality of versions of the source code of the service. The source code management application may be operable to store version information within, or in association with, the source code of the service. When different versions of the source code of the service are checked-in, the source code management application may automatically update the version information. In addition, the source code management application may receive version-related check-in comments from one or more developers of the service and may store these version-related comments as part of the version information. Every time a new executable version of the service is generated, the source code management application and/or a separate build process may retrieve the current version information associated with the source code and may store the retrieved version information in the contract of the service.

The approach described herein for versioning of services and service contracts is not limited to being performed by any particular type of build process or by any particular software or hardware application. For example, the approach described herein may be performed by a variety of software entities including, but not limited to, software versioning applications, integrated development environments (IDEs) that provide source code management as well as source code debugging and compilation, compilers, linkers, and any other software entities that are operable to manage and/or generate source or executable code. For this reason, the examples provided herein of suitable processes and applications operable to implement this approach are to be regarded in an illustrative rather than a restrictive sense.

VIII. Reporting Service Version Information

An approach is provided herein for reporting version information of services and service contracts. According to this approach, a service includes logic that is operable to receive and respond to get-version calls from composite applications that access the service. As used herein, "get-version" call refers to a request sent to a service for any version or version-related information associated with the service. In some embodiments, the service logic operable to respond to get-version calls from composite applications may return the current version information of the service. In some embodiments, in addition to or instead of the current version information, the service logic may be operable to return the service contract in which the current version information associated with the service may be stored.

Figure 4:
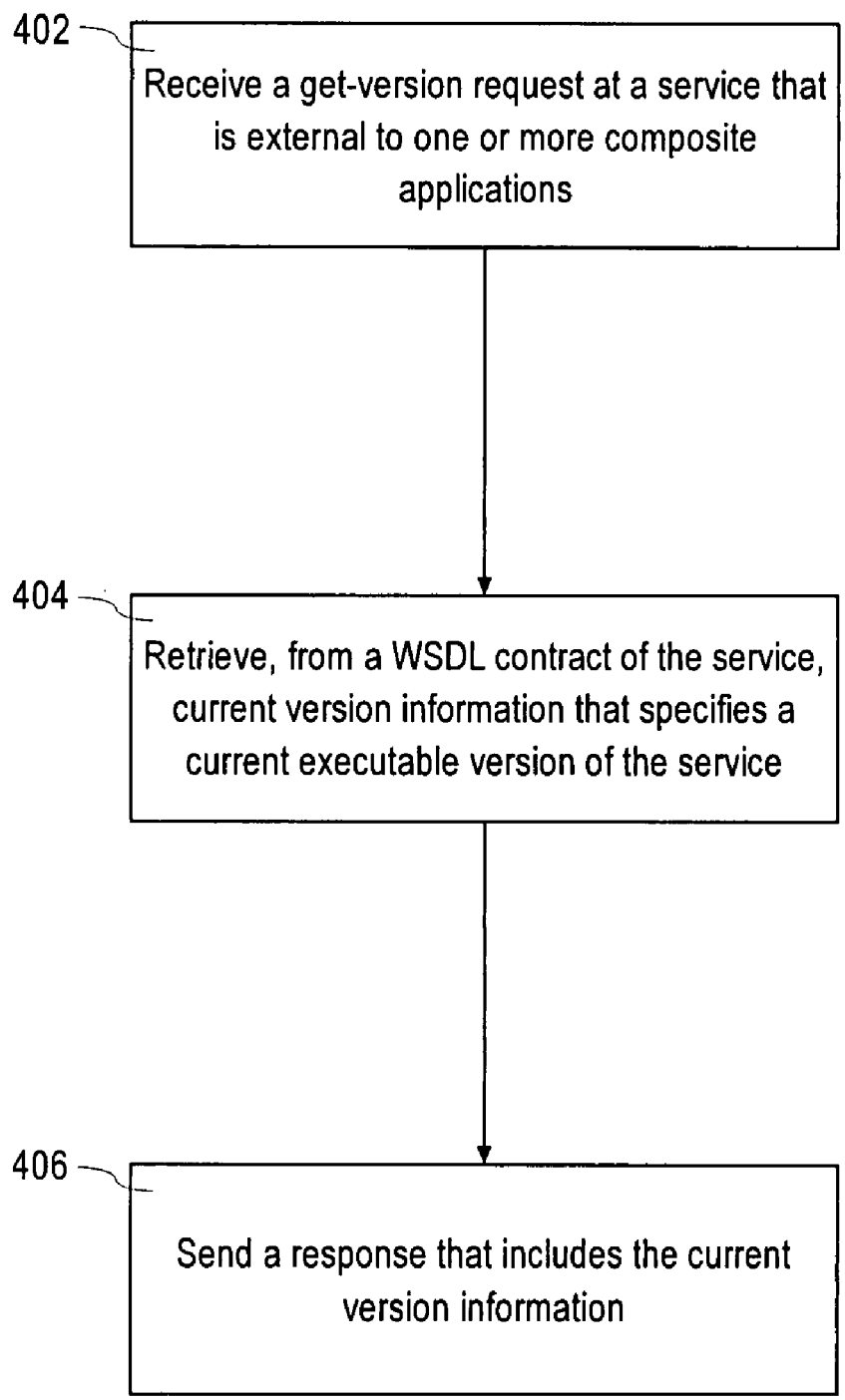
FIG. 4 is a flow diagram that illustrates a method for reporting version information about a service according to one embodiment.

FIG. 4 is a flow diagram that illustrates a method for reporting version information about a service according to this approach. In step 402, a service receives a get-version call from a particular composite application that is operable to access the service. The get-version call may include input parameters that conform to the input interface defined for the service.

In step 404, the service retrieves the current version information associated with the service from the contract that defines the input and output interface of the service. In step 406, the service sends a response to the get-version call, where the response includes the current version information of the service that was retrieved from the service contract. The response to the get-version call may include output parameters that conform to the output interface defined for the service. In some embodiments, the current version information returned by the service in response to a get-version call may be generated by a source code management application that is operable to maintain multiple versions of the source code of the service.

In one embodiment, the contract of a service may comprise a WSDL definition in an XML format. In this embodiment, version information associated with the service may be stored in a "version" XML element of the WSDL definition. In response to receiving a get-version call from a composite application, the service or a particular logic thereof may be operable to access the WSDL definition, retrieve the version information (e.g. the current version number, version-related comments, etc.) from the "version" XML element, and return the retrieved version information to the caller composite application. The retrieved version information may be returned to the composite application in a response that is XML-formatted.

In some embodiments, composite applications or other associated applications thereof (e.g. crawlers) may be operable to poll a service for the service's version information by periodically making get-version calls to the service. In these embodiments, a service may be optimized to respond to get-version calls by retrieving a copy of the current version information from persistent storage and storing it in volatile memory for faster access.

In some embodiments, in response to a get-version call, a service may retrieve from the service contract, and return to the caller composite application, a current version number of the service that indicates the current executable version of the service. In some embodiments, in addition to or instead of the current version number, the service may retrieve from the service contract, and return to the caller composite application, a version number that reflects a particular version of the contract itself.

In some embodiments, in addition to or instead of returning version information, the service may retrieve and return to the caller composite application a current copy of contract that specifies the input and output interfaces of the service. In these embodiments, the caller composite application may include logic that is operable to perform various operations on the current copy of the contract. For example, the composite application may include logic that is operable to: generate a current representation of the contract (for example, a hash token) for the purpose of determining whether the contract has changed since the time at which the composite application was generated; compare the current copy of the contract to a previously retrieved copy of the contract; and analyze whether any detected changes in the current copy of the contract affect the composite application.

In some embodiments, the version information returned by the service in response to a get-version call may include version-related comments that are provided by a developer. A composite application receiving such version information may include logic for determining, or for causing the determination of, the seriousness of the changes made to the version of the service that is reflected by the version information. For example, when a service contract comprises a WSDL definition in an XML format, the logic may be operable to automatically determine whether the version-related comments reference (by name or by some other identifier) any pre-selected WSDL definition elements that are utilized by the composite application. In another example, the logic may be operable to inspect the version-related comments for references to the service contract or any elements thereof, and to send notifications through any appropriate notification mechanisms when such references are detected in the version-related comments.

IX. Utilizing Different Executable Service Versions

An approach is provided herein for utilizing different executable versions of a service. According to this approach, a provider may support calls to multiple executable versions of a service, where the multiple executable versions may be associated with different service contracts. For example, in order to provide backward compatibility, a service may include logic that is operable to respond to calls that conform to a previous version of the contract that describes the input and output interfaces of the service.

According to this approach, a composite application (or an application external to the composite application) may include logic that is operable to retrieve version information from a service and determine, based on the version information, whether the composite application is properly configured to make calls to the current executable version of the service. If the logic determines that the composite application is configured to make calls to the current executable version of the service, then the composite application may proceed and access the service as normal. If the logic determines that the composite application is not configured to make calls to the current executable version of the service and if the service provides backward compatibility by supporting calls to prior executable versions, then the composite application may proceed by making calls to the service that are formatted for, and processable by, a specific prior executable version of the service. In this manner, the approach described herein addresses an operational scenario where a composite application for whatever reason is not operable to make calls to the current executable version and needs to access a prior executable version of the service.

Figure 5:
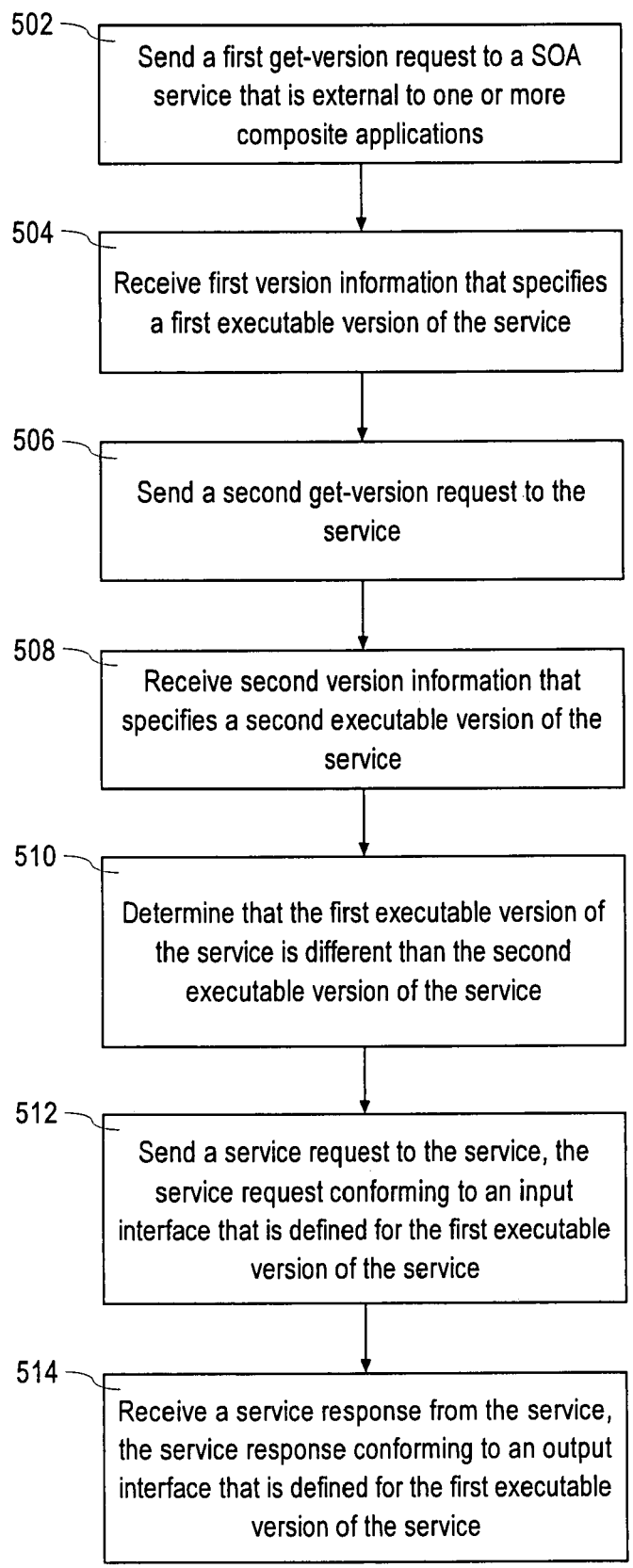
FIG. 5 is a flow diagram that illustrates a method for detecting and utilizing different executable versions of a service according to one embodiment.

FIG. 5 is a flow diagram that illustrates a method for detecting and utilizing different executable versions of a service according to this approach.

In step 502, a first get-version request is sent to a service. In some embodiments, the service may conform to a SOA standard and may be external to one or more composite applications. In response to the first get-version request, in step 504 first version information is received and stored. The first version information specifies a first executable version of the service, for example, by including a specific first version number. In some embodiments, the first version number may identify a particular executable version of the service and/or a particular version of the contract that describes the input and output interfaces of the service. In some embodiments, steps 502 and 504 may be performed at the time when a composite application is being generated. In these embodiments, the first version information received from the service may be stored in association with the composite application in order to indicate the particular executable version of the service which the composite application is configured to access.

Thereafter (periodically or before a service request is made to the service), in step 506 a second get-version request is sent to the service. In response to the second get-version request, in step 508 second version information is received. The second version information specifies a second executable version of the service, for example, by including a second version number. In some embodiments, the second version information may identify a particular executable version of the service and/or a particular version of the service contract. In these embodiments, the second version information may also include data indicating whether the service supports calls to any prior executable versions of the service. In step 510, based on the first version information and the second version information, a determination is made whether the first executable version of the service is different than the second executable version of the service. If a difference is detected, a notification may be sent to a pre-determined destination through any appropriate notification mechanism.

If in step 510 a determination is made that the first executable version is different than the second executable version and if the composite application is not configured to make calls to the second executable version of the service, then in step 512 the composite application sends to the service a service request that conforms to an input interface of the first executable version of the service as defined in a contract reflecting the first executable version. (As used herein, "service request" refers to a call to business logic of a service that is different than the service logic operable to provide version information about the service.) In some embodiments, the contract may comprise a WSDL definition that specifies zero or more input interfaces and/or zero or more output interfaces of the first executable version of the service. In some embodiments, the service request may further include data indicating the first version information or any version elements thereof; in these embodiments, based on this data the service may identify the specific executable version of the service that should respond to the service request.

In response to the service request, in step 514 the composite application receives a service response, where the service response conforms to the output interface that is defined in the contract associated with the first executable version of the service.

In some embodiments, steps 502 to 510 of the method illustrated in FIG. 5 may be performed by logic included in a composite application. In other embodiments, steps 502 to 510 may be performed by an application or process that is separate from the composite application. In these embodiments, in response to determining that the first executable version is different than the second executable version of the service, the separate application or process may notify the composite application through an appropriate mechanism that the service has experienced a version change. Thus, the approach provided herein for utilizing different executable versions of a service is not limited to being implemented by any particular software entity, and for this reason the example embodiments described herein are to be regarded in an illustrative rather than a restrictive sense X. Implementation Mechanisms Depending upon a particular implementation, the approaches described herein may be implemented in any context and on any kind of computing platform or architecture, and are not limited to any particular context, computing platform, or architecture. For purposes of explanation, FIG. 6 is a block diagram that illustrates an example computer system 600 upon which embodiments of the approaches described herein may be implemented.

Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the approaches described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
generating executable code of a composite application that is operable to access a service that is external to the composite application, wherein generating the executable code of the composite application comprises retrieving an initial copy of a contract that describes the service;
based on the initial copy of the contract, generating a baseline representation of the contract;
wherein the baseline representation of the contract includes a first token that is generated based on the initial copy of the contract, wherein the initial copy of the contract specifies an input interface and an output interface of the service at the time the composite application is generated;
storing the baseline representation of the contract;
executing the composite application;
during execution of the composite application, determining, based on the baseline representation of the contract, whether the contract has experienced any changes, wherein determining whether the contract has experienced any changes comprises:
retrieving a current copy of the contract;
generating a current representation of the contract based on the current copy of the contract;
wherein the current representation of the contract includes a second token that is generated based on the current copy of the contract, wherein the current copy of the contract specifies the input interface and the output interface of the service at the time the composite application is being executed; and
comparing the current representation of the contract to the baseline representation of the contract to determine whether the contract has experienced any changes;

wherein comparing the current representation to the baseline representation comprises comparing the second token to the first token; and in response to determining that the contract has experienced a change, sending a notification which indicates that the contract has experienced the change;

wherein the method is performed by one or more computer systems.

2. The computer-implemented method as recited in claim 1, wherein the contract includes a Web Services Description Language (WSDL) definition that describes the service.

3. The computer-implemented method as recited in claim 1, wherein the service and the composite application conform to a Service-Oriented Architecture (SOA) standard.

4. The computer-implemented method as recited in claim 1, wherein retrieving the initial copy of the contract comprises a build process making a call to the service, wherein the build process generates the executable code of the composite application.

5. The computer-implemented method as recited in claim 1, wherein determining whether the contract has experienced any changes is performed by a process that is separate from the composite application.

6. The computer-implemented method as recited in claim 1, further comprising:
periodically performing the steps of determining whether the contract has experienced any changes and sending the notification.

7. The computer-implemented method as recited in claim 1, wherein sending the notification comprises at least one of:
sending an e-mail to a user, wherein the e-mail indicates that the contract has experienced the change;
sending a message to a particular service port, wherein the message indicates that the contract has experienced the change;
storing a record in a log, wherein the record indicates that the contract has experienced the change; and
automatically opening a ticket in a defect tracking system, wherein the ticket indicates that the contract has experienced the change.

8. The computer-implemented method as recited in claim 1, further comprising:
in response to determining that the contract has experienced the change, analyzing the change to determine whether the change affects the composite application;
wherein, when analyzing the change determines that the change affects the composite application, sending the notification further comprises including first data in the notification, wherein the first data indicates how the change affects the composite application.

9. The computer-implemented method as recited in claim 8, wherein:
analyzing the change comprises analyzing the differences between the current copy of the contract and the initial copy of the contract, wherein analyzing the differences includes determining whether a current set of elements included in the current copy is the same as an initial set of elements included in the initial copy.

10. The computer-implemented method as recited in claim 1, wherein:
the composite application is operable to access a plurality of services that are external to the composite application, wherein a plurality of contracts describe the plurality of services; and
the method is performed for each service of the plurality of services.

11. A computer-implemented method comprising:
generating executable code of a composite application that is operable to access a service that is external to the composite application, wherein generating the executable code of the composite application comprises retrieving an initial copy of a contract that describes the service;
based on the initial copy of the contract, generating a baseline representation of the contract;
wherein the baseline representation of the contract includes the initial copy of the contract, wherein the initial copy of the contract specifies an input interface and an output interface of the service at the time the composite application is generated;
storing the baseline representation of the contract;
executing the composite application;
during execution of the composite application, determining, based on the baseline representation of the contract, whether the contract has experienced any changes, wherein determining whether the contract has experienced any changes comprises:
retrieving a current copy of the contract;
generating a current representation of the contract based on the current copy of the contract;
wherein the current representation of the contract includes the current copy of the contract, wherein the current copy of the contract specifies the input interface and the output interface of the service at the time the composite application is being executed; and
comparing the current representation of the contract to the baseline representation of the contract to determine whether the contract has experienced any changes;
wherein comparing the current representation to the baseline representation comprises comparing the current copy of the contract to the initial copy of the contract;
in response to determining that the contract has experienced a change, sending a notification which indicates that the contract has experienced the change;
wherein the method is performed by one or more computer systems.

12. A computer-implemented method comprising:
generating executable code of a composite application that is operable to access a service that is external to the composite application, wherein generating the executable code of the composite application comprises retrieving an initial copy of a contract that describes the service;
based on the initial copy of the contract, generating a baseline representation of the contract;
wherein the baseline representation of the contract includes first version information that is stored in the initial copy of the contract, wherein the first version information specifies a first executable version of the service at the time the composite application is generated;
storing the baseline representation of the contract;
executing the composite application;
during execution of the composite application, determining based on the baseline representation of the contract, whether the contract has experienced any changes, wherein determining whether the contract has experienced any changes comprises:
retrieving a current copy of the contract;
generating a current representation of the contract based on the current copy of the contract;

wherein the current representation of the contract includes second version information that is stored in the current copy of the contract, wherein the second version information specifies a second executable version of the service at the time the composite application is being executed; and comparing the current representation of the contract to the baseline representation of the contract to determine whether the contract has experienced any changes;

wherein comparing the current representation to the baseline representation comprises comparing the second version information to the first version information;

in response to determining that the contract has experienced a change, sending a notification which indicates that the contract has experienced the change;

wherein the method is performed by one or more computer systems.

13. A computer-implemented method comprising:

generating executable code of a composite application that is operable to access a service that is external to the composite application, wherein generating the executable code of the composite application comprises retrieving an initial copy of a contract that describes the service;

based on the initial copy of the contract, generating a baseline representation of the contract;

wherein the baseline representation of the contract includes:

the initial copy of the contract, wherein the initial copy of the contract specifies an input interface and an output interface of the service at the time the composite application is generated; and first version information that specifies a first executable version of the service at the time the composite application is generated;

storing the baseline representation of the contract;

executing the composite application;

during execution of the composite application, determining, based on the baseline representation of the contract, whether the contract has experienced any changes, wherein determining whether the contract has experienced any changes comprises:

retrieving a current copy of the contract;

generating a current representation of the contract based on the current copy of the contract;

wherein the current representation of the contract includes:

the current copy of the contract, wherein the current copy of the contract specifies the input interface and the output interface of the service at the time the composite application is being executed; and second version information that specifies a second executable version of the service at the time the composite application is being executed; and comparing the current representation of the contract to the baseline representation of the contract to determine whether the contract has experienced any changes;

wherein comparing the current representation to the baseline representation comprises:

comparing the second version information to the first version information; and when the second version information is the same as the first version information, comparing the current copy of the contract to the initial copy of the contract to determine whether the contract has experienced any changes;

in response to determining that the contract has experienced a change, sending a notification which indicates that the contract has experienced the change;

wherein the method is performed by one or more computer systems.

14. A computer-implemented method comprising:

generating executable code of a composite application that is operable to access a service that is external to the composite application, wherein generating the executable code of the composite application comprises retrieving an initial copy of a contract that describes the service;

based on the initial copy of the contract, generating a baseline representation of the contract;

storing the baseline representation of the contract;

executing the composite application;

during execution of the composite application, determining, based on the baseline representation of the contract, whether the contract has experienced any changes, wherein determining whether the contract has experienced any changes comprises:

retrieving a current copy of the contract;

determining whether the baseline representation of the contract stores first version information, wherein the first version information specifies a first executable version of the service at the time the composite application is generated;

determining whether the current copy of the contract stores second version information, wherein the second version information specifies a second executable version of the service at the time the composite application is being executed;

when the baseline representation of the contract stores the first version information and the current copy of the contract stores the second version information, comparing the second version information to the first version information to determine whether the contract has experienced any changes; and when the baseline representation of the contract does not store the first version information or when the current copy of the contract does not store the second version information, performing the steps of:

generating a current representation of the contract based on the current copy of the contract; and comparing the current representation of the contract to the baseline representation of the contract to determine whether the contract has experienced any changes;

in response to determining that the contract has experienced a change, sending a notification which indicates that the contract has experienced the change;

wherein the method is performed by one or more computer systems.

15. A non-transitory machine-readable volatile or non-volatile medium storing a composite application, wherein the composite application when executed is operable to access a service that is external to the composite application and to access a baseline representation of a contract that describes the service, wherein the baseline representation is generated from an initial copy of the contract that is retrieved at the time the executable code of the composite application is generated, wherein the baseline representation of the contract includes a first token that is generated based on the initial copy of the contract, wherein the initial copy of the contract specifies an input interface and an output interface of the service at the time the composite application is generated, the machine-readable medium storing instructions which, when performed by one or more processors, cause performance of steps comprising:
    during execution of the composite application, determining, based on the baseline representation of the contract, whether the contract has experienced any changes, wherein determining whether the contract has experienced any changes comprises:
        retrieving a current copy of the contract;
        generating a current representation of the contract based on the current copy of the contract;
        wherein the current representation of the contract includes a second token that is generated based on the current copy of the contract, wherein the current copy of the contract specifies the input interface and the output interface of the service at the time the composite application is being executed; and
        comparing the current representation of the contract to the baseline representation of the contract to determine whether the contract has experienced any changes;
        wherein comparing the current representation to the baseline representation further comprises comparing the second token to the first token; and
    in response to determining that the contract has experienced a change, sending a notification which indicates that the contract has experienced the change.

16. The non-transitory machine-readable volatile or non-volatile medium as recited in claim 15, wherein the contract includes a Web Services Description Language (WSDL) definition that that describes the service.

17. The non-transitory machine-readable volatile or non-volatile medium as recited in claim 15, wherein the service and the composite application conform to a Service-Oriented Architecture (SOA) standard.

18. The non-transitory machine-readable volatile or non-volatile medium as recited in claim 15, wherein a build process has retrieved the initial copy of the contract by making a call to the service, wherein the build process has generated the executable code of the composite application.

19. The non-transitory machine-readable volatile or non-volatile medium as recited in claim 15, wherein the instructions that cause determining whether the contract has experienced any changes are included in a software component that is separate from the composite application.

20. The non-transitory machine-readable volatile or non-volatile medium as recited in claim 15, further comprising instructions which, when performed by the one or more processors, cause:
    periodically determining whether the contract has experienced any changes and sending the notification.

21. The non-transitory machine-readable volatile or non-volatile medium as recited in claim 15, wherein the instructions that cause sending the notification further comprise instructions which, when performed by the one or more processors, cause at least one of:
    sending an e-mail to a user, wherein the e-mail indicates that the contract has experienced the change;
    sending a message to a particular service port, wherein the message indicates that the contract has experienced the change;
    storing a record in a log, wherein the record indicates that the contract has experienced the change; and
    automatically opening a ticket in a defect tracking system, wherein the ticket indicates that the contract has experienced the change.

22. The non-transitory machine-readable volatile or non-volatile medium as recited in claim 15, further comprising instructions which, when performed by the one or more processors, cause:
    in response to determining that the contract has experienced the change, analyzing the change to determine whether the change affects the composite application;
    wherein the instructions that cause sending the notification further comprise instructions which, when performed by the one or more processors, cause including first data in the notification when analyzing the change determines that the change affects the composite application, wherein the first data indicates how the change affects the composite application.

23. The non-transitory machine-readable volatile or non-volatile medium as recited in claim 22, wherein:
    the instructions that cause analyzing the change further comprise instructions which, when performed by the one or more processors, cause analyzing the differences between the current copy of the contract and the initial copy of the contract, wherein analyzing the differences includes determining whether a current set of elements included in the current copy is the same as an initial set of elements included in the initial copy.

24. The non-transitory machine-readable volatile or non-volatile medium as recited in claim 15, wherein the composite application is operable to access a plurality of services that are external to the composite application, wherein a plurality of contracts describe the plurality of services, and wherein the plurality of services includes the service and the plurality of contracts includes the contract.

25. A non-transitory machine-readable volatile or non-volatile medium storing a composite application, wherein the composite application when executed is operable to access a service that is external to the composite application and to access a baseline representation of a contract that describes the service, wherein the baseline representation is generated from an initial copy of the contract that is retrieved at the time the executable code of the composite application is generated, wherein the baseline representation of the contract includes the initial copy of the contract, wherein the initial copy of the contract specifies an input interface and an output interface of the service at the time the composite application is generated, the machine-readable medium storing instructions which, when performed by one or more processors, cause performance of steps comprising:
    during execution of the composite application, determining, based on the baseline representation of the contract, whether the contract has experienced any changes, wherein determining whether the contract has experienced any changes comprises:
        retrieving a current copy of the contract;
        generating a current representation of the contract based on the current copy of the contract;
        wherein the current representation of the contract includes the current copy of the contract, wherein the current copy of the contract specifies the input interface and the output interface of the service at the time the composite application is being executed; and
        comparing the current representation of the contract to the baseline representation of the contract to determine whether the contract has experienced any changes;

wherein comparing the current representation to the baseline representation further comprises comparing the current copy of the contract to the initial copy of the contract;

in response to determining that the contract has experienced a change, sending a notification which indicates that the contract has experienced the change.

26. A non-transitory machine-readable volatile or non-volatile medium storing a composite application, wherein the composite application when executed is operable to access a service that is external to the composite application and to access a baseline representation of a contract that describes the service, wherein the baseline representation is generated from an initial copy of the contract that is retrieved at the time the executable code of the composite application is generated, wherein the baseline representation of the contract includes first version information that is stored in the initial copy of the contract, wherein the first version information specifies a first executable version of the service at the time the composite application is generated, the machine-readable medium storing instructions which, when performed by one or more processors, cause performance of steps comprising:

during execution of the composite application, determining, based on the baseline representation of the contract, whether the contract has experienced any changes, wherein determining whether the contract has experienced any changes comprises:

retrieving a current copy of the contract;

generating a current representation of the contract based on the current copy of the contract;

wherein the current representation of the contract includes second version information that is stored in the current copy of the contract, wherein the second version information specifies a second executable version of the service at the time the composite application is being executed; and comparing the current representation of the contract to the baseline representation of the contract to determine whether the contract has experienced any changes;

wherein comparing the current representation to the baseline representation further comprises comparing the second version information to the first version information;

in response to determining that the contract has experienced a change, sending a notification which indicates that the contract has experienced the change.

27. A non-transitory machine-readable volatile or non-volatile medium storing a composite application, wherein the composite application when executed is operable to access a service that is external to the composite application and to access a baseline representation of a contract that describes the service, wherein the baseline representation is generated from an initial copy of the contract that is retrieved at the time the executable code of the composite application is generated, wherein the baseline representation of the contract includes the initial copy of the contract, wherein the initial copy of the contract specifies an input interface and an output interface of the service at the time the composite application is generated, and first version information that specifies a first executable version of the service at the time the composite application is generated, the machine-readable medium storing instructions which, when performed by one or more processors, cause performance of steps comprising:

during execution of the composite application, determining, based on the baseline representation of the contract, whether the contract has experienced any changes, wherein determining whether the contract has experienced any changes comprises:

retrieving a current copy of the contract;

generating a current representation of the contract based on the current copy of the contract;

wherein the current representation of the contract includes:

the current copy of the contract, wherein the current copy of the contract specifies the input interface and the output interface of the service at the time the composite application is being executed; and second version information that specifies a second executable version of the service at the time the composite application is being executed; and comparing the current representation of the contract to the baseline representation of the contract to determine whether the contract has experienced any changes;

wherein comparing the current representation to the baseline representation further comprises:

comparing the second version information to the first version information; and when the second version information is the same as the first version information, comparing the current copy of the contract to the initial copy of the contract to determine whether the contract has experienced any changes;

in response to determining that the contract has experienced a change, sending a notification which indicates that the contract has experienced the change.

28. A non-transitory machine-readable volatile or non-volatile medium storing a composite application, wherein the composite application when executed is operable to access a service that is external to the composite application and to access a baseline representation of a contract that describes the service, wherein the baseline representation is generated from an initial copy of the contract that is retrieved at the time the executable code of the composite application is generated, the machine-readable medium storing instructions which, when performed by one or more processors, cause performance of steps comprising:

during execution of the composite application, determining, based on the baseline representation of the contract, whether the contract has experienced any changes, wherein determining whether the contract has experienced any changes comprises:

retrieving a current copy of the contract;

determining whether the baseline representation of the contract stores first version information, wherein the first version information specifies a first executable version of the service at the time the composite application is generated;

determining whether the current copy of the contract stores second version information, wherein the second version information specifies a second executable version of the service at the time the composite application is being executed;

when the baseline representation of the contract stores the first version information and the current copy of the contract stores the second version information, comparing the second version information to the first version information to determine whether the contract has experienced any changes; and when the baseline representation of the contract does not store the first version information or when the current copy of the contract does not store the second version information, performing the steps of:

generating a current representation of the contract based on the current copy of the contract; and comparing the current representation of the contract to the baseline representation of the contract to determine whether the contract has experienced any changes;

in response to determining that the contract has experienced a change, sending a notification which indicates that the contract has experienced the change.

* * * * *